United States Patent [19]
Premel et al.

[11] Patent Number: 4,734,110
[45] Date of Patent: Mar. 29, 1988

[54] METHOD AND APPARATUS FOR REMOVING SOLIDS FROM PRESSURIZED PROCESS SYSTEM

[75] Inventors: Ulrich Premel, Gummersbach; Ralf U. Hartermann, Wiehl, both of Fed. Rep. of Germany

[73] Assignees: L. & C. Steinmüller GmbH, Gummersbach; VEW Vereinigte Elektrizitätswerke Westfalen AG, Dortmund, both of Fed. Rep. of Germany

[21] Appl. No.: 21,974

[22] Filed: Mar. 5, 1987

Related U.S. Application Data

[63] Continuation-in-part of Ser. No. 720,038, Apr. 5, 1985, abandoned.

[30] Foreign Application Priority Data

Apr. 6, 1984 [DE] Fed. Rep. of Germany ....... 3412930

[51] Int. Cl.[4] ............................................. B01D 46/04
[52] U.S. Cl. .......................................... 55/96; 55/97; 55/302; 55/337; 55/523; 406/172; 406/173
[58] Field of Search ..................... 55/96, 97, 302, 337, 55/523; 406/172, 173

[56] References Cited

U.S. PATENT DOCUMENTS

| 2,892,512 | 6/1959 | Watts et al. ...................... 55/523 X |
| 3,950,152 | 4/1976 | Guon ........................................ 55/96 |
| 4,223,748 | 9/1980 | Barendsen ............................ 55/97 X |
| 4,237,800 | 12/1980 | Kullendorff et al. ............. 55/337 X |
| 4,249,227 | 1/1981 | Gohler et al. ..................... 55/302 X |
| 4,362,442 | 12/1982 | Bentzen-Bilkvist et al. ... 406/173 X |
| 4,406,330 | 9/1983 | Sysky .................................. 55/96 X |

Primary Examiner—Charles Hart
Attorney, Agent, or Firm—Becker & Becker, Inc.

[57] ABSTRACT

A method and apparatus for removing solid material from a process system pressurized by a process gas, especially process gases having a high content of solid material. The method operates cyclically. In a first cycle, the solid material is separated, via filter cartridges of sintered material, and accompanied by pressure-relief, practically completely from pressure-relieved gas in a pressurized receiving tank. In a second cycle, the solid material is removed from the receiving tank. In a third cycle, while simultaneously cleaning the filter cartridges of solid material adhering thereto, the receiving tank is pressurized. Finally, in a fourth cycle, solid material is removed from the process system. The apparatus includes a receiving tank, with at least two filter cartridges being provided on the gas outlet side thereof. The filter cartridges, alone or together with a prior connected cyclone for separating-out large-grained particles of solid material, can be disposed in the receiving tank or a tank is separate therefrom.

11 Claims, 5 Drawing Figures

METHOD AND APPARATUS FOR REMOVING SOLIDS FROM PRESSURIZED PROCESS SYSTEM

BACKGROUND OF THE INVENTION

This is a continuation-in-part of co-pending U.S. application Ser. No. 720,038-Premel et al filed Apr. 5, 1985 (now abandoned) and belonging to the assignee of the present invention.

1. Field of the Invention

The present invention relates to a method and apparatus for removing solid material, such as powder or dust, from pressurized process gases of a process system.

2. Description of the Prior Art

Methods are known, according to which solids, such as flue dust, are removed in a dry state. In order to do so, the removal tanks which are utilized are very large, since they can be only slightly filled in order to avoid the undesirable effect of having solid materials carried along by the gas during the pressure relief. However, large tank volumes also entail large gas volumes during the pressurization, and result in long cycle times and hence long removal times. To remove large quantities of solid material, it is necessary to operate a plurality of removal systems parallel to one another. With this heretofore known method, the various valves are partially stressed by the solid materials, which leads to extremely severe wear, and hence to short service lives. Furthermore, with this method a second transport path must be provided for the solid material which escapes through the pressure-relief valve.

An object of the present invention therefore is to provide a method and apparatus of the aforementioned general type which permits the removal of solid materials from pressurized process gases with short removal times and with a long duration of the overall removal system, especially of the pressure-relief valves.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
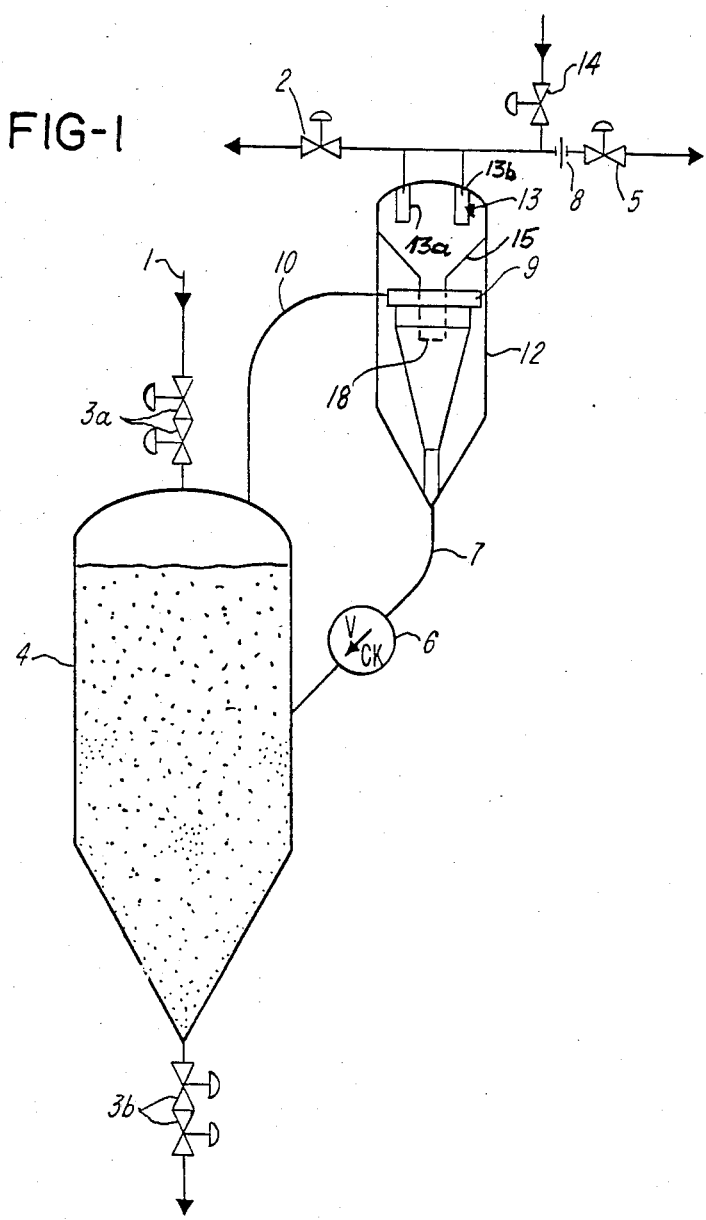
FIG. 1 shows one inventive embodiment in which the filter cartridges, together with a cyclone, are disposed in a tank which is separate from the receiving and discharge tank.

The method of the present invention is a cyclical method and includes the steps of:

conveying solid material together with process gas to a solid material receiving tank:

closing off said solid material receiving tank filled with said solid material from said process gas in said pressurized solid material receiving tank to a nearly normal pressure via filter cartridges of sintered material extending longitudinally in a tank with cartridges, the process gas entering said filter cartridges from the mantle surface thereof and leaving the filter cartridges at one end thereof practically free of solid material;

removing said solid material from said solid material receiving tank; pressurizing said solid material receiving tank via said filter cartridges with process gas from said process system to the pressure of said process system, said process gas for pressurizing entering said filter cartridges at said one end thereof and leaving it through said mantle surface thereof, while at the same time cleaning said filter cartridges;

connecting said solid material receiving tank to said process system after equalizing said pressure via said filter cartridges and conveying said solid material from said process system into said solid material receiving tank; and successively repeating the aforementioned steps.

The inventive method can be utilized with all pressurized process gases which contain solid material. It is particularly applicable to process gases resulting during the partial or complete gasification of residue containing coal or carbon. Process pressures during partial or complete gasification of coal range from 20 to 60 bar. Typical process pressures during the partial gasification of coal are about 25 bar. During the pressureless removal, pressure is relieved to starting pressures in the vicinity of atmospheric pressure, i.e. approximately 1 to 2 bar, and typically 1.3 to 1.5 bar, especially 1.4 bar.

It is particularly advantageous to apply the inventive method to process gases from the partial gasification of coal, where a high solid material content of 40 to 60% is encountered. With such process gases which have a high content of solid material, a quantitiy of coal solids produced in the process and collected in the process system must be removed in a relatively short period of time from the process system, i.e. a considerably shorter cycling period is available than is the case with process gases which have a low content of solid material.

With the utilization of filter cartridges of sintered material for the intermittent process of the pressure relief, a nearly complete separation of solid material from pressure-relieved gas is achieved at the same time at relatively short removal times in the order of magnitude of approximately eight minutes for all cycles. The filter cartridges comprise known sintered material, such as sintered metal (for example on a chromium-nickle base) or sintered ceramic, and have a pore size adapted to the granule range of the solid material in the process gas; such pore size can, for example, range from 3 to 20 $\mu$m.

Depending upon the granule size distribution of the solid material which is contained in the process gas, if practically only fine granules are present, it suffices to dispose the longitudinally extending filter cartridges in the top of the receiving tank and convey the solid material into the receiving tank to a level that the filter cartridges are covered by said solid material to a greater extent or in a preferred manner substantially completely. However, if the process gas also contains a larger portion of coarse granules, it may be expedient to separate out the larger granules in a cyclone, before the finer granules are separated from the pressure-relieved gas by means of the filter cartridges. In this arrangement, cyclone and filter cartridges can either be disposed in a tank separate from the receiving tank or in the receiving tank.

A throttle element, for example a restrictor, is necessary for controlling the mass flow, and is disposed ahead of the exit valve; the throttle element is connected between said ends of said filter cartridges and said pressure relief valve.

In the embodiment where the cyclone and filter cartridges are disposed in a tank which is separate from the receiving tank, the separated-out solid material is returned to the receiving tank via a line. Alternatively, it is also possible to convey the separated-out solid material from the cyclone to a further container, for example a bin or accumulator. With this embodiment, where the cyclone and filter cartridges are disposed in a tank separate from the receiving tank, and the separated-out solid material is not conveyed into the receiving tank, but rather is conveyed, for example, right away for final storage or disposition, pressurizing gas can be used to accomplish this conveying.

In the simplest case, the system for arrangement for carrying out the inventive method includes a pressure-tight receiving tank connected to said process system for receiving said solid material and said pressurized process gas, said solid material receiving tank being provided at inlet and outlet sides with sluice valves for the solid material and at a gas outlet side with pressurizing and pressure-relieving valves, said apparatus furthermore having the improvement comprising:

A filter cartridges tank: filter cartridges of sintered material arranged in said filter cartridges tank and extending in longitudinal direction thereof and serving alternately for equalizing the gas pressure between the pressurized process system and said solid material receiving tank and for relieving said gas pressure within said solid material receiving tank, while separating said solid material from the gas leaving the solid material receiving tank during pressure-relief. If the portion of large solid material granules is high, a cyclone is disposed ahead of the filter cartridges in the flow path of the pressure-relieved gas. This cyclone can be disposed in the receiving tank, or can be disposed together with the filter cartridges in the separate tank. In this case, the cyclone output and the receiving tank are connected either by a check valve or a conveying device, preferably a screw conveyer, with the inlet into the receiving container being disposed at a lower part of the receiving tank. For the purpose of pressure equalization, the receiving tank is connected with the process side. Also, as a part of the inventive apparatus, pressurizing and pressure-relieved valves are provided, which, in the direction of flow of the pressure-relieved gas, are disposed after the filter cartridges. A throttle element is disposed in the pressure-relieving line ahead of the pressurizing valve.

DESCRIPTION OF PREFERRED EMBODIMENTS

Referring now to the drawings in detail, in FIG. 1 the reference numeral 1 represents the process system which is under process pressure. In the event of a partial coal gasification, after pressure equalization with the process system via an equalizing line 2, the ungasified coal, along with the flue dust, collected in the process system and some process gas can pass from the process system 1, via sluice valves 3a, into the pressure-tight receiving tank or container 4 in a very short time, i.e. momentarily and nearly completely filling up the receiving tank 4. After the valves 3a are closed, pressure relief is effected by opening the pressure relief valve 5. The check valve 6 prevents pressure release via the connecting line 7. During the pressure-relieving process, i.e. reduction of the pressure, the solid material in the receiving tank is lifted up and part of it (e.g. 40%) is conveyed to the cyclone 9 via the line 10. During the filling of tank 4, the line 10 also serves to convey the gas displaced by the solid material in the tank to the process system via line 2. The solid material separated-out in the cyclone 9 again passes into the tank 4 via the connecting line 7, which is provided with the check valve 6 (preferably in form of a nonreturn plate). In place of the valve 6, conveying means, such as the screw conveyer 11 illustrated in FIG. 2, can be installed, which at the same time can operate as a flow obstructing means during pressure relief. The finer solid material which is not separated-out passes from the cyclone 9 into the upper portion of the pressure-tight tank 12, in the lower portion of which the cyclone is arranged, and is deposited onto sintered metal filter cartridges 13, extending longitudinally in the tank 12. The pressure relieving gas enters through the mantel surfaces 13a of the cartridges 13 and leaves through the ends 13b and then passes via the pressure relief valve 5 into accumulators provided for that purpose. The pressure reduction is effected via the sintered filter cartridges 13 arranged downstream of the cyclone 9, and essentially via the pressure relief valve 5. After removal of the solid material from the receiving tank via of the valves 3b, pressurization of the receiving tank 4 is effected via the valve 14 with clean process gas from the process system 1, entering into the filter cartridges 13 via ends 13b thereof, so that the mantel surface 13a is cleaned. The fine material kept by the cartridges during pressure relief and being removed from the mantel surface during pressurization is collected in a funnel 15 and is falling through the tube 18 in the cyclone 9 into connecting line 7a. Clean process gas, i.e. dustfree gas is used for pressurization to avoid erosion wear in conduits and valves.

Figure 3:
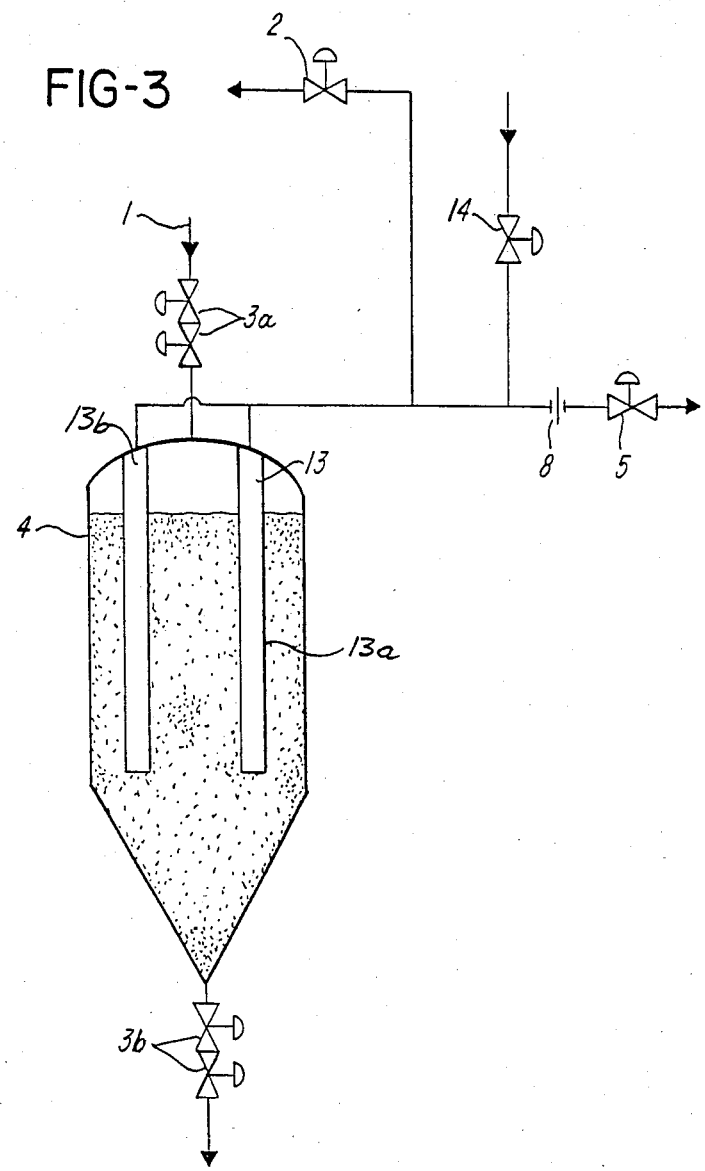
FIG. 3 shows a further embodiment which is particularly suitable for the separation of fine-grained solid material, and in which the filter cartridges are disposed in the receiving tank.

In the embodiment illustrated in FIG. 3, which is particularly suitable for separating fine-grained solid material, the cyclone 9 and the tank 12 are eliminated, and the filter cartridges 13 are disposed in the receiving tank 4. The tank is filled to level as to nearly completely cover the cartridges 13.

Figure 4:
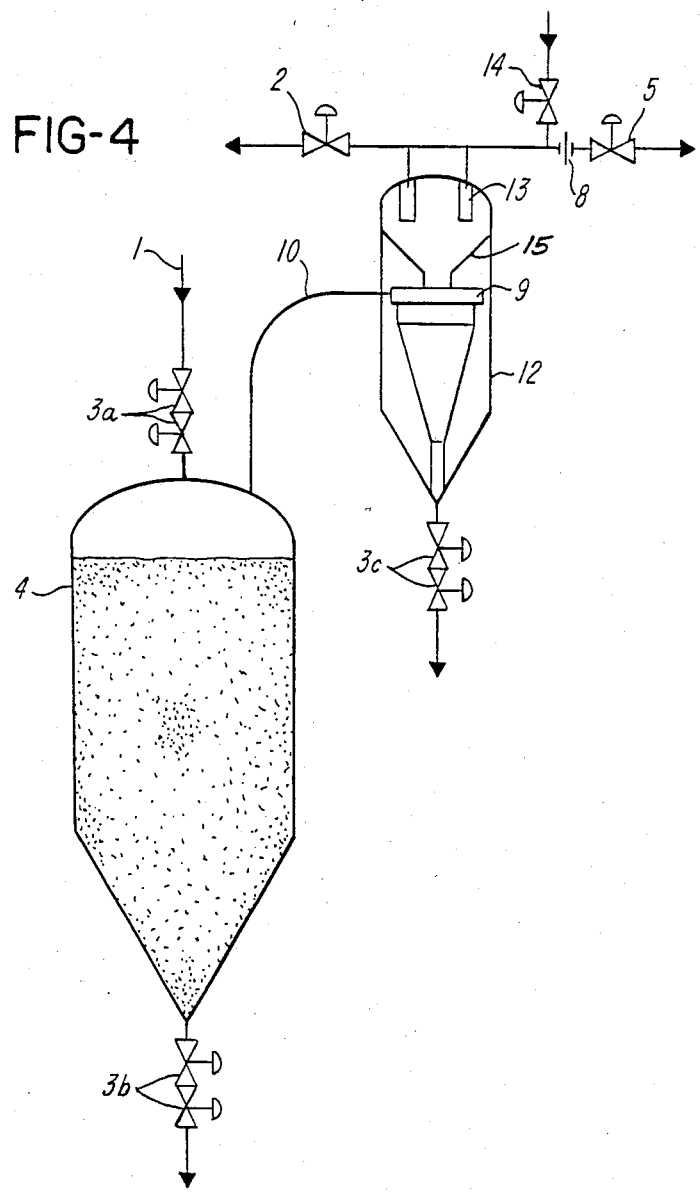
FIG. 4 shows yet another inventive embodiment, in which the solid material separated in the cyclone is conveyed to another accumulator.

In the embodiment illustrated in FIG. 4, the solid material separated-out in the cyclone 9 is conveyed to a separate accumulator via the valves 3c disposed at the bottom of the tank 12.

Figure 5:
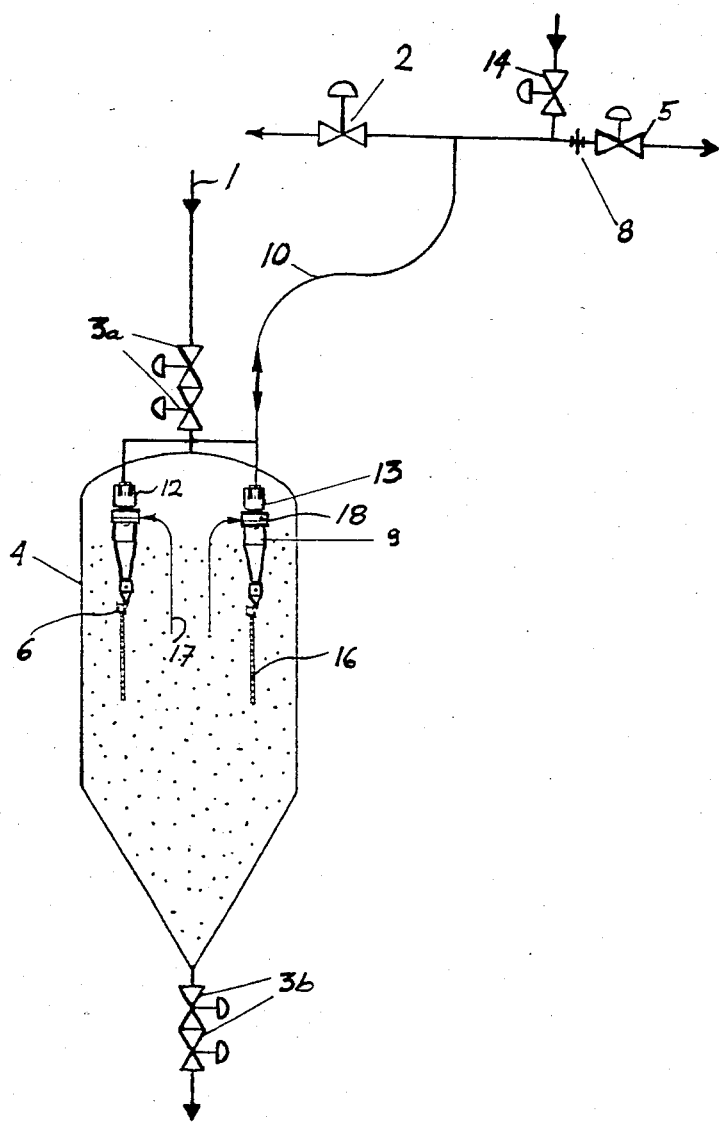
FIG. 5 shows a fifth inventive embodiment, in which the two cyclones and the filter cartridges are arranged in the receiving and discharge tank.

In the embodiment illustrated in FIG. 5, the solid material is separated-out in one or more cyclones 9 arranged in the receiving tank itself. With this embodiment, the tank 12 does not need to surround the cyclones 9, because they are surrounded by the tank 4. At the lower end of each cyclone 9, the check valve 6 and a depending outlet tube 16 are provided. The relief gas and lifted solid material enters directly into the cyclone as shown by the arrows 17.

Figure 2:
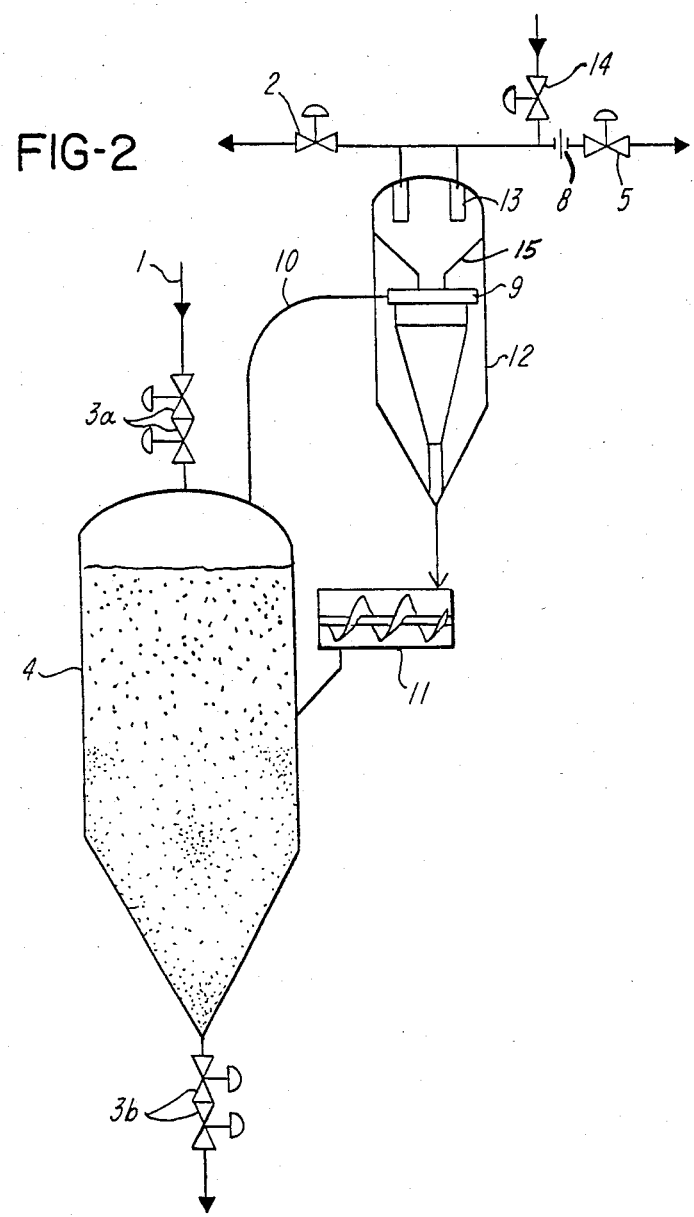
FIG. 2 shows a second inventive embodiment which differs from the embodiment of FIG. 1 by the presence of a screw conveyer for returning the material which was separated in the cyclone to the receiving and discharge tank.

With all embodiments, the tank 4 is shown substantially in its filled status. If the pressure differential over the cyclone 9 is not sufficient, the cyclone is arranged somewhat higher with respect to the tank 4, so that the static head of solid material secures the transport into tank 4 as shown in FIGS. 1, 2, 4.

The method and apparatus of the present invention have the following advantages:

1. It is possible to remove the solid material produced in the process in a dry state by intermittently withdrawing solid material from the process system in short coveying time periods.
2. The pressure of the system can be high.
3. The particle size of the solid material can be as small as 5 μm.
4. The pressure-relief times can be short.
5. The pressure relief valve 5 is installed in the dust-free region downstream of the dust separating unit; no valves which would be endangered by erosion are installed between the receiving tank and the separator.
6. By separating out the large portions in the cyclone, a prior easing of the load of the filter cartridges is effected; both separating elements are installed in a common pressure tank 12.
7. If necessary, several of the tanks 12 can be provided and can be disposed around the receiving tank 4.
8. By pressurizing the system via the valve 14, the filter cartridges are cleaned at the same time, with the solid material which falls off being returned via the cyclone to the receiving tank 4.
9. Due to the preliminary separation in the cyclone, less dust cake is built up about the mantel surface 13a of filter cartridges 13; thus, less of a pressure loss occurs, which leads to a reduction of the pressure-relief time.
10. The inventive system functions reliably even during intermittently high loading with solid materials.

The present invention is, of course, in no way restricted to the specific disclosure of the specifications and drawings, but also encompasses any modifications within the scope of the appended claims.

What we claim is:

1. A method of removing dust-like or dust containing solid material from a process system pressurized by a process gas; said method including the steps of:
   conveying solid material together with process gas to a solid material receiving tank;
   closing off said solid material receiving tank filled with said solid material from said process system and relieving the pressure of said process gas in said pressurized solid material receiving tank to a nearly normal pressure via filter cartridges of sintered material extending longitudinally in a cartridges tank, the process gas entering said filter cartridges from a mantle surface thereof and leaving the filter cartridges at one end thereof practically free of solid material;
   removing said solid material from said solid material receiving tank; pressurizing said solid material receiving tank via said filter cartridges with process gas from said process system to the pressure of said process system, said process gas for pressurizing entering said filter cartridges at said one end thereof and leaving it through said mantle surface thereof, while at the same time cleaning said filter cartridges;
   connecting said solid material receiving tank to said process system after equalizing said pressure via said filter cartridges and conveying said solid material from said process system into said solid material receiving tank; and
   successively repeating the aforementioned steps.

2. A method according to claim 1, which includes the step of removing solid material from a coal pressure gasification process system.

3. A method according to claim 1, which includes the step of using said solid material receiving tank also as said cartridge tank and conveying solid material into said receiving tank to a level that the filter cartridges are covered by said solid material conveyed into said solid material receiving tank.

4. A method according to claim 1, which includes the step of using a cyclone to separate out large-granule solid material from said process gas prior to subjecting said gas to said filter cartridges.

5. A method according to claim 4, which includes the step of using the cartridge tank to receive also said cyclone.

6. A method according to claim 4, which includes the step of conveying solid material from said cyclone into said solid material receiving tank.

7. An apparatus for removing dry dust-like or dust containing solid material from a process system pressurized by process gases; said apparatus including
   a solid material receiving tank connected to said process system for receiving said solid material and said pressurized process gas in a flow during operation, said solid material receiving tank being provided at inlet and outlet sides with sluice valves for the solid material and at a gas outlet side with pressurizing and pressure-relieving valves, said apparatus furthermore having the improvement therewith comprising:
   at least one pressure tight tank including at least rigid filter cartridges, said rigid filter cartridges of sintered material being impinged upon by the flow cyclically in opposite directions during continuous operation as arranged in said at least one pressure tight tank and extending in longitudinal direction thereof and serving alternately for equalizing the gas pressure between the pressurized process system and said solid material receiving tank and for relieving said gas pressure within said solid material receiving tank, while separating said solid material from the gas leaving the solid material receiving tank during pressure-relief, said filter cartridges making possible operation since cleaning removal of the dust-like or dust containing solid material sluiced out from the process system is made possible by pressure change via said filter cartridges.

8. An apparatus according to claim 7, in which said at least pressure tight tank is disposed in said solid material receiving tank.

9. An apparatus according to claim 7, in which further means including at least one cyclone is arranged together with said filter cartridges in said at least one pressure tight tank in the flow of process gas.

10. An apparatus according to claim 7, in which further means including at least one cyclone is arranged together with said at least one pressure tight tank in said solid material receiving tank in the flow of process gas.

11. An apparatus according to claim 7, which, for regulating the mass flow of said process gases, includes a throttle element between said ends of said cartridges serving for gas inlet or outlet and said pressure-relief valve.

* * * * *